United States Patent [19]

Niederer et al.

[11] 4,258,839

[45] Mar. 31, 1981

[54] EGG TRANSFER BAR

[75] Inventors: Lee H. Niederer; Thomas O. Niederer, both of Titusville, N.J.

[73] Assignee: Otto Niederer Sons, Inc., Pennington, N.J.

[21] Appl. No.: 78,405

[22] Filed: Sep. 24, 1979

[51] Int. Cl.³ .............................................. B65G 37/00
[52] U.S. Cl. ...................................... 198/478; 119/48; 198/646; 198/653
[58] Field of Search ................ 198/460, 655, 653, 646, 198/680, 706, 478; 119/48

[56] References Cited

U.S. PATENT DOCUMENTS

| | | | |
|---|---|---|---|
| 3,613,860 | 10/1971 | Waite | 198/420 |
| 3,623,591 | 11/1971 | Koch | 198/432 |
| 3,710,918 | 1/1973 | Babunovic | 198/445 |
| 3,716,127 | 2/1973 | Loeffler | 198/446 |
| 3,848,730 | 11/1974 | Niederer et al. | 198/655 |
| 3,854,868 | 12/1974 | Willsey | 198/446 |
| 3,874,494 | 4/1975 | Temming | 198/446 |
| 3,973,667 | 8/1976 | Jellema | 198/652 X |
| 4,042,100 | 8/1977 | Morrone | 198/446 |
| 4,117,922 | 10/1978 | Niederer | 198/652 |

Primary Examiner—Robert B. Reeves
Assistant Examiner—Douglas D. Watts
Attorney, Agent, or Firm—John J. Kane; Frederick A. Zoda; Albert Sperry

[57] ABSTRACT

An egg transfer bar for use in groups arranged in parallel extending rows to form egg carrying conveyors, wherein each bar includes a main shaft, said main shaft defining a plurality of egg receiving locations each including a set of support members which are movably secured to the main shaft or to a carriage member which is, itself secured to the transfer bar, each of said support members within a set of support members being individually and independently pivotally movable with respect to the carriage member or the main shaft, each support member presenting an upwardly facing arcuate surface which is concave in the upwardly facing direction to thereby define the egg receiving locations laterally along the egg transfer bar, with use of the carriage member the egg transfer bar includes a pivot shaft which is secured to the carriage member and provides the point of attachment of each of the support members to the carriage member, each support member being pivotally movable about the pivot shaft or the main shaft to allow selective individual movement of each support member to allow release of an egg from the egg receiving location therebelow, the support members being biased into a steady state egg holding position, positioned by a resilient biasing device which is secured to the carriage member or the main shaft and urges the support members to be held in the horizontal orientation, each support member being movable to a releasing position responsive to a force being exerted against an abutment surface defined by the individual support members.

13 Claims, 4 Drawing Figures

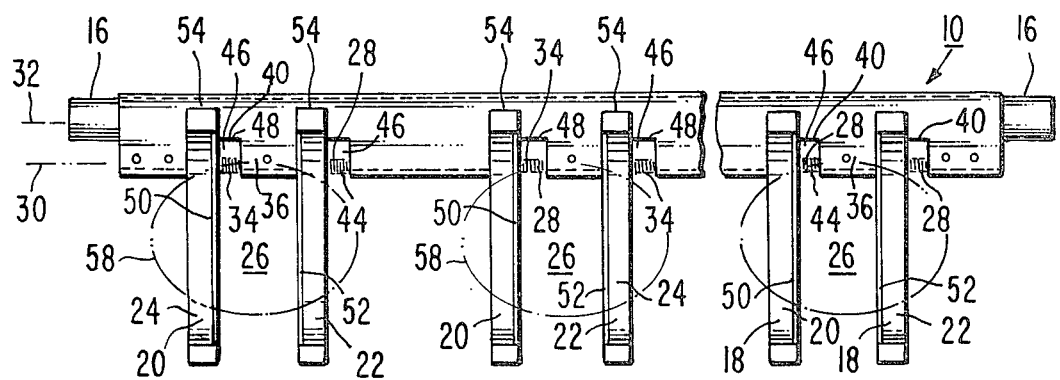
Fig. 1.
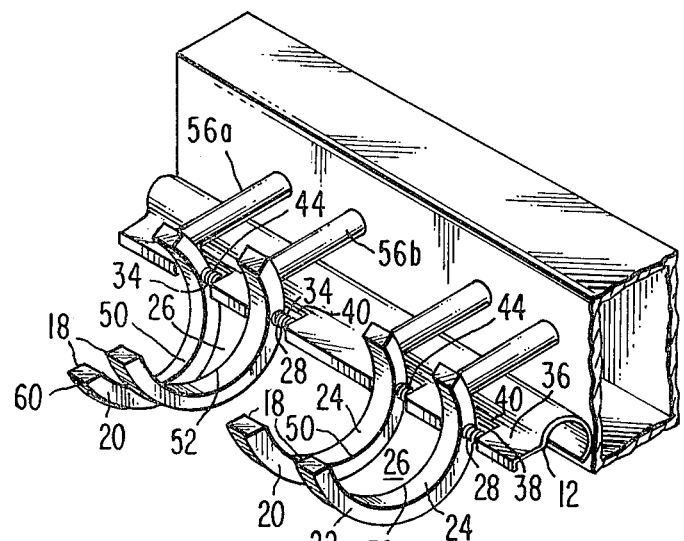
Fig. 2.
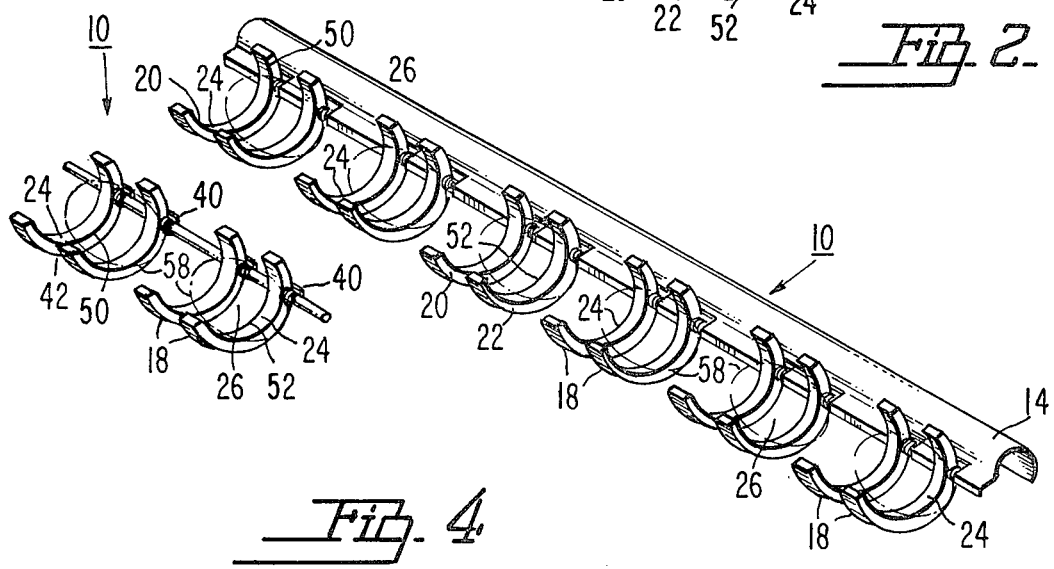
Fig. 4.
Fig. 3.

EGG TRANSFER BAR

BACKGROUND OF THE INVENTION

1. Field of the Invention

The present invention deals with the field of means for conveying eggs throughout egg processing systems from one egg processing station to another egg processing station.

2. Description of the Prior Art

Many of the devices utilized in the prior art for conveying eggs through a processing system include springs, moving belts, as well as conveying systems including discrete egg carrying locations as in the present design. The present invention makes use of the main shaft or a pivot shaft which is parallel to and yet spaced from the axis of the main shaft such that the individual egg holding retainers are rotatable while allowing the main shaft to remain stationary and still release the eggs or pick up the eggs as desired.

All prior art devices which utilize two supporting members for holding the eggs and for defining each individual egg receiving recess utilize simultaneous movement of each of the two egg supporting members to pick up or release eggs. The present invention provides a novel system wherein each of the supporting members is individually rotatable or pivotal about the pivot axis to allow selective rotation of an egg as desired or to impart a given impetus or momentum to an egg to carry it to a specifically desired location therebelow. Also by special chosen releasing of either end responsive to egg orientation, a packing or ordering of all eggs may be achieved with all "egg points" down or all "up" even with an initial random orientation upon the conveying means.

SUMMARY OF THE INVENTION

The present invention provides a conveying system for eggs which utilizes a plurality of egg transfer bars which are arranged in rows to form egg carrying conveyors. Each individual egg transfer bar includes a main shaft receiving means to allow movable attachment between a main shaft which carries the carriage member and the carriage member itself. Alternatively, the carriage member can be omitted and the support members be mounted directly to the main shaft.

Each carriage member has secured thereto a plurality of sets of support members. Preferably six such sets will be associated with each support member. Each set of a support member comprises two support members which for reference will be defined to be a first support member and a second support member. Each of the first and second support members are individually and independently pivotally movable both with respect to the main shaft and with respect to one another. In other words, the first support member can be in the down position while the second support member is in the up position or the reverse. Each of the first and second support members also includes arcuate surfaces which are concave facing in an upward direction to thereby provide egg receiving locations laterally along the transfer bar and at each position are one of the sets of support members or thereby preferably providing six egg receiving locations along each carriage member.

Each carriage member may include a pivot shaft means which is secured to the carriage member and is positioned parallel to the location of the main shaft but laterally spaced therefrom. In this manner the pivot shaft axis will be parallel to and spaced from the main shaft axis. Of course, alternatively, the pivot axis will be coincidental with the main shaft axis if the carriage is not included. Each of the support members is movably secured to the carriage member or the main shaft by being pivotally secured thereto to allow selective rotational movement of the individual support members about the axis. In this manner each of the first and second support members are independently movable.

Each support member includes an associated resilient biasing means which is attached to the carriage member or the main shaft at one end and to the pivot member at the other end. Preferably, this resilient biasing means takes the form of a spring means which is spirally wound about the main shaft or the pivot shaft and secured at one end thereto and at the other end to the support member. In this manner the support member will be maintained in the steady state horizontal orientation to hold an egg retained therein.

Each of the support members further includes an abutment surface. Each of the carriage means further defines a plurality of stopping surfaces the location of each support member such that the abutment surface of each of the support members will be biased by its associated resilient biasing means into contact with the stopping surface located thereadjacent to thereby hold the support member in the steady state horizontal position.

A biasing by a cam member against a camming surface of the support member will be capable of overcoming the force exerted by the resilient biasing means and causing the associated support member to be rotated about the pivot shaft to release an egg therebelow. This movement can take place simultaneously for each of the first and second support members of a given set of support members to release an egg directly therebelow. Alternatively, either the first or the second support member can individually be rotated by contacting a camming member against the specific cam surface to allow the egg to be released having a lateral releasing momentum.

In this manner rotation of the main shaft will allow release of all of the eggs positioned in all of the egg receiving locations on a given transfer bar. Alternatively, individual rotation of individual sets of support members will allow release of an egg directly therebelow at one or more of the egg receiving locations on a given transfer bar. Further alternatively, causing a camming member to contact the camming surface of either a first or second support member of one or more of the sets of support members on a given transfer bar will allow the release of individual eggs from the egg receiving locations of the transfer bar and impart a given momentum or impetus to the egg upon this release in either direction as desired.

This transfer bar may further include a plurality of slot means which are defined by the carriage member adjacent each of the support members. This slot means will include a rearward edge which provides the stopping surface against which the support members are biased when in the steady state horizontal egg holding position. Furthermore, the arcuate upwardly facing surfaces of the support members may include beveled edges which will face the associated support member of a given set in order to provide a contoured or upwardly facing lateral arcuate surface for firmly securing eggs within the egg receiving location.

It is an object of the present invention to provide an egg transfer bar which is adapted to be used in groups arranged in parallel rows to form egg carrying conveyors.

It is an object of the present invention to provide an egg transfer bar which allows release of all the eggs held in the egg receiving locations of the egg transfer bar simultaneously by rotation of the main holding shaft of the egg transfer bar.

It is an object of the present invention to provide an egg transfer bar which defines a plurality of as many as 12 or more egg receiving locations therealong.

It is an object of the present invention to provide an egg transfer bar which allows individual release of individual eggs held within individual egg receiving locations on a given transfer bar.

It is an object of the present invention to provide an egg transfer bar which defines a plurality of egg receiving locations wherein two support members are used to hold each egg within each location and wherein the two support members are individually rotatable to allow release of an egg with a given lateral impetus therebelow.

It is an object of the present invention to provide an egg transfer bar including a plurality of support members held in a steady state horizontal egg holding position by a resilient biasing means which comprises a spirally wound spring means fixedly secured to a carriage and fixedly secured to the individual support members.

It is an object of the present invention to provide an egg transfer bar which includes a slot means for holding the resilient biasing means, the pivot shaft means, and the rotational securing location of the individual support members to the carriage member which further includes an opaque shield extending outwardly therefrom between the individual support members to facilitate candling operations which require the minimization of stray light passing upwardly longitudinally along a given row of eggs.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a top plan view of an embodiment of an egg transfer bar holding eggs;

FIG. 2 is a perspective view of an embodiment of a single set of support members;

FIG. 3 is a perspective view of a group of embodiments of the egg transfer bar of the present invention; and FIG. 4 is a top plan view of an alternative embodiment of the egg transfer bar holding eggs.

DETAILED DESCRIPTION OF THE PREFERRED EMBODIMENT

The present invention provides an egg transfer bar which is particularly usable in groups extending laterally across egg conveying system such that it defines a plurality of egg receiving recesses 26 arranged laterally in groups of as many as 12 or more and arranged longitudinally in rows.

Egg transfer bar may include a carriage member 12 which is rotatably movable and defines a main shaft receiving means 14. The main shaft means 16 may extend into this main shaft receiving means. In this manner rotation of the main shaft means 16 may cause rotation of the entire carriage member 12 or rotation of the carriage without rotation of the main shaft will cause similar movement of the carriage member 12.

A plurality of sets 18 of support members are secured with respect to each carriage member 12. Preferably, each set 18 of support member includes a first support member 20 and the second support member 22. Each support member should include upwardly facing arcuate surfaces 24 which thereby define egg receiving locations 26 at each position of the set 18 of support members along each transfer bar 10. These upwardly facing arcuate or concave surfaces can be any cup-like upwardly directed surfaces and need not be smoothly curved, i.e. they may include angles or flat sections.

Adjacent each support member is a pivot shaft means 28. This pivot shaft means 28 is preferably fixedly secured with respect to the carriage member 12 and provides the means of pivotal mounting of the support members 20 and 22 with respect to the transfer bar 10. Although the pivot shaft means 28 is not itself rotatable, it defines a pivot shaft axis 30 which provides the axis of rotation of the individual support members 20 and 22 when they are rotated independently of the egg transfer bar 10. The pivot shaft axis is oriented parallel to the main shaft axis 32 but horizontally displaced with respect thereto. In particular, the pivot shaft means 28 is itself fixedly secured to the carriage member 12. Similarly, the main shaft means 16 is fixedly or movably secured to the carriage member 12, however, they are laterally displaced and thus provide independent means of movement for the individual sets 18 of support members 20 and 22. In other words, the eggs located within the egg receiving locations 26 may be released or eggs may be placed within the egg receiving locations by movement of the support members 20 and 22 which may be caused selectively by rotation of the carriage means 12 about the means 16, or by rotation of the individual support members 20, 22.

In the normal condition a resilient biasing means 34 biases the individual support members 20 and 22 into the steady state horizontal position 42. Preferably, this resilient biasing means 34 takes the form of a spring means 44 which is spirally wound about the pivot shaft means 28, as shown in FIG. 1, or about the main shaft 16 as shown in FIG. 4, and is fixedly secured at one end to the carriage member 12, or main shaft 16 and is fixedly secured at the other end to its associated support member. In this manner, the support member will be rotated as shown in FIG. 2 in the clockwise direction until the abutment surface 38 on an individual support member is caused to contact with the stopping surface 40. In this orientation the set 18 of support members 20 and 22 will assume the steady state position 42 which is the horizontally extending position for holding eggs. A camming member 56 as shown in FIG. 2 may be caused to be urged against the cam surface 54 of a support member to cause the support member to be rotated as shown in FIG. 2 in the counter-clockwise direction. In this manner an egg may be released therebelow without actual rotation of the main shaft means 16 or carriage means 12. Of course, it would be possible to simultaneously release both the first support member 20 and the second support member 22 of the given set 18 to release an egg directly therebelow which also would be independent of movement of the main shaft means 16 or carriage member 12, however, releasing can also be accomplished and the egg being released can be given a lateral impetus or momentum by the releasing of only one of the two support members of a given set 18 of such of support members. Also an egg can be oriented with "point" up or "point" down by actuation of one of the egg support members and not the other. In this manner the egg 58 can be imparted in a given direction or toward a given location responsive to selective operation of the supporting members 20 and 22. In this manner, control of the individual eggs 58 located within the individual egg receiving locations 26 on the same egg transfer bar 10 can be achieved. This individual control is highly desirable when processing eggs differing in weight or quality. The releasing position 60 is shown in FIG. 2 with the first support member 20 being in the releasing orientation and with the second support 22 being shown in the steady state position 42.

In the configuration shown in FIG. 4 the support members 20 and 22 are all rotational secured to the main shaft and a pivot shaft, pivot axis and carriage member are not included. A stopping means 40 is shown to maintain the support members in the steady state horizontally extending orientation during the carrying of eggs. This configuration is operable identically to the previous configuration by exerting a bias against the upwardly extending innermost edge of the support member to selectively release one or both of the support members to impart an egg given impetus or momentum to the egg or to orient all the eggs in a "point" up or "point" down order.

The present invention may also include an opaque light shield 36 which are found to be extremely useful when candling eggs by blocking some of the extraneous light passing upwardly around the egg and confining light primarily to be flowing upwardly through the egg such that flaws are readily visible.

In a preferred embodiment of the present invention a slot means 46 is included which retains the pivot shaft therein as well as the resilient spring biasing means and the support member. The slot means would include a rearmost edge 48 which with the slotted configuration would function as the stopping surface 40 of the carriage member 12.

In order to facilitate the holding of eggs within the egg receiving locations 26, the first support member 20 may include a first beveled edge 50 and the second support member 22 may include a second beveled edge 52. Preferably these beveled edges are facing one another within a given set 18 of support members 20 and 22 such that a smooth contour is presented to facilitate the holding of eggs within the individual egg receiving locations 26.

Therefore, in operation it is apparent that the picking up or releasing of eggs with respect to the egg receiving location 26 can be performed by rotation of the main shaft means 16 or carriage member 12, or by rotation of an individual set 18 of support members. Further alternatively, this control can be achieved by individual releasing of first support member 20 or second support member 22 of a given set 18 of support members by selective contact between the camming member 56 with respect to the camming surface 54 of the individual support members being rotated to the releasing position 60. This additional element of control has proven to be desirable in order to achieve an efficient control of egg conveying systems as a whole. No present devices are available and, as such, the applicant has designed this improved and novel system for efficiently controlling eggs individually traveling within an egg conveying and processing system.

While particular embodiments of this invention have been shown in the drawings and described above, it will be apparent, that many changes may be made in the form, arrangement and positioning of the various elements of the combination. In consideration thereof it should be understood that preferred embodiments of this invention are intended to be illustrative only and not intended to limit the scope of the invention.

We claim:

1. An egg trasfer bar, adapted for use in groups arranged in parallel rows to form egg carrying conveyors, each of which comprises:
   (a) a main shaft extending transversely across the direction of movement of the conveyor;
   (b) a plurality of sets of support members movably secured with respect to said main shaft, each said set including a first support member and a second support member each being individually and independently pivotally movable with respect to said main shaft, said first and second support members including arcuate surfaces being concave in an upwardly facing direction to provide egg receiving locations laterally along said egg transfer bar at each position of one of said sets of support members, said main shaft defining a main shaft axis extending laterally across the conveyor, said sets of support members being movably secured to said main shaft by being pivotally secured thereto to allow selective rotational movement of said sets of support members thereabout, each of said first and second support members being independently movable with respect to one another; and
   (c) a plurality of resilient biasing means each being attached to said main shaft, one of said resilient biasing means being attached to said first support members, another of said resilient biasing means being attached to said second support members for individual operable control thereof, each of said first and second support members defining an abutment surface and said main shaft defining a plurality of stopping surfaces adjacent the location of each of said first and second support members such that the abutment surface of each of said first and second support members will be biased by its associated resilient biasing means into contact with said stopping surface located thereadjacent to hold each of said first and second support members in the steady state horizontally extending position.

2. An egg transfer bar, adapted for use in groups arranged in parallel rows to form egg carrying conveyors, each of which comprises:
   (a) a carriage member including a main shaft receiving means to allow fixed securement between the main shaft and said carriage member;
   (b) a plurality of sets of support members movably secured to said carriage member, each said set including a first support member and a second support member each being individually and independently pivotally movable with respect to said carriage member, said first and second support members including arcuate surfaces being concave in an upwardly facing direction to provide egg receiving locations laterally along said egg transfer bar at each position of one of said sets of support members;

(c) a pivot shaft means secured to said carriage member, said pivot shaft means defining a pivot shaft axis positioned parallel to and laterally spaced from a main axis of a main shaft when positioned within said main shaft receiving means of said carriage member, said sets of support members being movably secured to said carriage member by being pivotally secured to said pivot shaft means to allow selective rotational movement of said sets of support members about said pivot shaft axis, each of said first and second support members being independently movable with respect to one another; and (d) a plurality of resilient biasing means each being attached to said carriage member, one of said resilient biasing means being attached to each of said first and second support members for individual control thereof, each of said first and second support members defining an abutment surface and said carriage means defining a plurality of stopping surfaces adjacent the location of each of said first and second support members such that the abutment surface of each of said first and second support members will be biased by its associated resilient biasing means into contact with said stopping surface located thereadjacent to hold each of said first and second support members in the steady state position.

3. The transfer bar as defined in claim 2 wherein said pivot shaft means is movably secured to said carriage member to be removable with respect thereto.

4. The transfer bar as defined in claim 2 further comprising a main shaft means affixed to said carriage member by being fixedly secured into said main shaft receiving means such that rotational movement of said shaft means will cause similar movement of said carriage member.

5. The transfer bar as defined in claim 2 wherein each of said resilient biasing means comprises a spring means being spirally wound around said pivot shaft axis and secured with respect to said carriage member at one end and with respect to said support member at the other end to hold the support member in the steady state condition with said abutment surface in contact with said stopping surface.

6. The transfer bar as defined in claim 2 further comprising a plurality of slot means defined by said carriage member adjacent each of said first and second support members, said slot means including a rearward edge, said pivot shaft means extending across said slot means with said support member pivotally secured thereto within said slot means, said rearward edge of said slot means providing said stopping surface.

7. The transfer bar as defined in claim 2 wherein said arcuate upwardly surface of said first support member includes a first beveled edge on the side thereof adjacent said second support member of said set and wherein said arcuate surface of said second support member includes a second beveled edge on the side thereof adjacent said first support member of said set.

8. The transfer bar as defined in claim 2 wherein each of said support members defines a cam surface adapted to be contacted by a camming member to cause pivotal rotation of said support members about said pivot shaft means to selectively release an egg therefrom.

9. An egg transfer bar, adapted for use in groups arranged in parallel rows to form egg carrying conveyors, each of which comprises;

(a) a carriage member including a main shaft receiving means to allow fixed securement between a main shaft and said carriage member;

(b) a main shaft means affixed to said carriage member by being fixedly secured into said main shaft receiving means such that rotational movement of said main shaft receiving means will cause similar movement of said carriage member;

(c) a plurality of sets of support members movably secured to said carriage member, each set including a first support member and a second support member each being individually and independently pivotally movable with respect to said carriage member, said first and second support members including arcuate surfaces being concave in an upwardly facing direction to provide egg receiving locations laterally along said egg transfer bar at each position of one of said sets of support members, each of said support members further defining a cam surface adapted to be contacted by a camming member to cause pivotal rotation of said support member about said pivot shaft means to selectively release an egg therefrom;

(d) a pivot shaft means being fixedly secured to said carriage member to be immovable with respect thereto, said pivot shaft means defining a pivot shaft axis positioned or parallel to and laterally spaced from a main axis of a main shaft when positioned within said main shaft receiving means of said carriage member, said sets of support members being movably secured to said carriage member by being pivotally secured to said pivot shaft means to allow selective rotational movement of said sets of support members about said pivot shaft axis, each of said first and second support members being independently movable with respect to one another; and (e) a plurality of resilient biasing means each being attached to said carriage member, one of said resilient biasing means being attached to each of said first and second support members for individual control thereof, each of said first and second support members defining an abutment surface and said carriage means defining a plurality of stopping surfaces adjacent the locations of each of said first and second support members such that the abutment surface of each of said first and second support members will be biased by its associated resilient biasing means into contact with said stopping surface location thereadjacent to hold each of said first and second support members in the steady state position, each of said resilient biasing means actually comprising a spring means being spirally wound around said pivot shaft means and secured with respect to said carriage member at one end and secured with respect to said support member at the other end to hold the support member in the steady state condition with said abutment surface in contact with said stopping surface.

10. The transfer bar as defined in claim 9 further comprising a plurality of slot means defined by said carriage member adjacent each of said first and second support members, said slot means including a rearward edge, said pivot shaft means extending across said slot means with said support member pivotally secured thereto within said slot means, said rearward edge of said slot means with said support member pivotally secured thereto within said slot means, said rearward edge of said slot means providing said stopping surface.

11. The transfer bar as defined in claim 9 wherein said arcuate upwardly facing surface of said first support member includes a first beveled edge on the side thereof adjacent said second support member of said set and wherein said arcuate surface of said second support member includes a second beveled edge on the side thereof adjacent said first support member of said set.

12. The egg transfer bar as defined in claim 1 wherein said arcuate upwardly facing surface of said support member includes a first beveled edge on the side thereof adjacent said second support member of said set and wherein said arcuate surface of said second support member includes a second beveled edge on the side thereof adjacent said first support member of said set.

13. The egg transfer bars defined in claim 1 wherein each of said support members defines a cam surface adapted to be contacted by a camming member to cause pivotal rotation of said support members about said pivot shaft means to selectively release an egg therefrom.

* * * * *